US008473470B1

(12) United States Patent
Cook, Jr. et al.

(10) Patent No.: US 8,473,470 B1
(45) Date of Patent: Jun. 25, 2013

(54) SYSTEM FOR PROVIDING COLLABORATIVE COMMUNICATIONS ENVIRONMENT FOR MANUFACTURERS AND POTENTIAL CUSTOMERS

(75) Inventors: Jack S. Cook, Jr., Bethlehem, CT (US); Diego Alexander Diaz Pabon, Waterbury, CT (US); Benjamin John Ewing, Edgewater, MD (US)

(73) Assignee: Bentley Systems, Incorporated, Exton, PA (US)

( * ) Notice: Subject to any disclaimer, the term of this patent is extended or adjusted under 35 U.S.C. 154(b) by 530 days.

(21) Appl. No.: 11/135,591

(22) Filed: May 23, 2005

(51) Int. Cl.
*G06F 7/00* (2006.01)
*G06F 17/30* (2006.01)

(52) U.S. Cl.
USPC .......... 707/705; 707/706; 707/709; 707/710; 706/12; 706/14; 706/20

(58) Field of Classification Search
USPC .............. 705/1–14; 707/1; 703/777; 715/530
See application file for complete search history.

(56) References Cited

U.S. PATENT DOCUMENTS

| | | | |
|---|---|---|---|
| 5,742,762 A | 4/1998 | Scholl et al. | |
| 5,970,472 A * | 10/1999 | Allsop et al. | 705/26 |
| 6,058,379 A | 5/2000 | Odom et al. | |
| 6,141,653 A | 10/2000 | Conklin et al. | |
| 6,178,393 B1 * | 1/2001 | Irvin | 703/10 |
| 6,330,543 B1 | 12/2001 | Kepecs | |
| 6,338,050 B1 | 1/2002 | Conklin et al. | |
| 6,405,364 B1 * | 6/2002 | Bowman-Amuah | 717/101 |
| 6,463,460 B1 * | 10/2002 | Simonoff | 709/203 |
| 6,519,571 B1 * | 2/2003 | Guheen et al. | 705/14 |
| 6,601,057 B1 * | 7/2003 | Underwood et al. | 707/1 |
| 6,615,166 B1 * | 9/2003 | Guheen et al. | 703/27 |
| 6,662,357 B1 * | 12/2003 | Bowman-Amuah | 717/120 |
| 6,697,825 B1 * | 2/2004 | Underwood et al. | 715/530 |
| 6,701,514 B1 * | 3/2004 | Haswell et al. | 717/115 |
| 6,721,713 B1 * | 4/2004 | Guheen et al. | 705/1 |
| 6,957,186 B1 * | 10/2005 | Guheen et al. | 705/1 |
| 6,957,199 B1 * | 10/2005 | Fisher | 705/78 |
| 7,107,184 B2 * | 9/2006 | Gentile et al. | 702/182 |
| 7,315,834 B2 * | 1/2008 | Martineau et al. | 705/26 |
| 7,324,965 B2 * | 1/2008 | Martineau et al. | 705/26 |
| 7,328,177 B1 * | 2/2008 | Lin-Hendel | 705/27 |
| 2002/0016861 A1 * | 2/2002 | Simonoff | 709/250 |
| 2002/0035536 A1 * | 3/2002 | Gellman | 705/37 |

(Continued)

OTHER PUBLICATIONS

Roure, Tso, Lambert, Securing a Open Hypermedia System, (OHS) Using Mqseries Everyplace (MQE), University if Southhampton, IBM Corporation, 2002, pp. 1-4.*

(Continued)

*Primary Examiner* — Angelica Ruiz
(74) *Attorney, Agent, or Firm* — Cesari and McKenna, LLP (57) ABSTRACT

A software program and associated web-based portal is provided for industry-specific product comparison. The program and an associated web portal allows the user the ability to search multiple manufacturers' catalogs and to enter a query based upon customized search criteria. Query results are returned of products that satisfy the user's search criteria. The query is made available to manufacturers whose products are identified in the query results and a communication link is provided whereby such manufacturers can contact the user to discuss the product identified in the search. The user can respond using the message board associated with the web portal. The program and portal can also integrate updates to pump manufacturers' catalogs and can also produce best-fit solutions for users' design criteria.

16 Claims, 6 Drawing Sheets

U.S. PATENT DOCUMENTS

| | | | |
|---|---|---|---|
| 2002/0046099 A1* | 4/2002 | Frengut et al. | 705/14 |
| 2002/0059054 A1* | 5/2002 | Bade et al. | 703/20 |
| 2002/0112028 A1* | 8/2002 | Colwill, Jr. | 709/218 |
| 2002/0147517 A1* | 10/2002 | Messler | 700/97 |
| 2003/0028451 A1* | 2/2003 | Ananian | 705/27 |
| 2003/0046534 A1* | 3/2003 | Alldredge | 713/153 |
| 2003/0050986 A1* | 3/2003 | Matthews et al. | 709/206 |
| 2003/0059030 A1* | 3/2003 | Tenorio | 379/300 |
| 2003/0061004 A1* | 3/2003 | Discenzo | 702/182 |
| 2003/0120653 A1* | 6/2003 | Brady et al. | 707/7 |
| 2003/0139975 A1* | 7/2003 | Perkowski | 705/26 |
| 2003/0187672 A1* | 10/2003 | Gibson et al. | 705/1 |
| 2003/0212654 A1* | 11/2003 | Harper et al. | 707/1 |
| 2003/0227487 A1* | 12/2003 | Hugh | 345/777 |
| 2004/0001104 A1* | 1/2004 | Sommerer et al. | 345/811 |
| 2004/0015367 A1* | 1/2004 | Nicastro et al. | 705/1 |
| 2004/0049473 A1* | 3/2004 | Gower et al. | 706/46 |
| 2004/0083231 A1* | 4/2004 | Boros et al. | 707/104.1 |
| 2004/0098467 A1* | 5/2004 | Dewey et al. | 709/219 |
| 2004/0103040 A1* | 5/2004 | Ronaghi et al. | 705/26 |
| 2004/0107125 A1* | 6/2004 | Guheen et al. | 705/7 |
| 2004/0243580 A1* | 12/2004 | Markki et al. | 707/9 |
| 2004/0260689 A1* | 12/2004 | Colace et al. | 707/3 |
| 2004/0267561 A1* | 12/2004 | Meshkin et al. | 705/1 |
| 2005/0080502 A1* | 4/2005 | Chernyak et al. | 700/97 |
| 2005/0108147 A1* | 5/2005 | Scroope | 705/37 |
| 2005/0144067 A1* | 6/2005 | Farahat et al. | 705/14 |
| 2005/0165829 A1* | 7/2005 | Varasano | 707/102 |
| 2005/0203762 A1* | 9/2005 | Tebeau et al. | 705/1 |
| 2005/0203888 A1* | 9/2005 | Woosley et al. | 707/3 |
| 2005/0222813 A1* | 10/2005 | Bjornson | 702/183 |
| 2005/0228511 A1* | 10/2005 | Das et al. | 700/28 |
| 2006/0106575 A1* | 5/2006 | Gentile et al. | 702/182 |
| 2006/0117012 A1* | 6/2006 | Rizzolo et al. | 707/9 |
| 2006/0200804 A1* | 9/2006 | Cyr et al. | 717/120 |

OTHER PUBLICATIONS

J. Wang et al, "Domain-specific portal for the precision component and tooling industry in Singapore—needs analysis and a test-bed bed mplementation" Jun. 2003, Robotics and Computer Integrated Manufacturing 19, pp. 479-491.*

Rodriguez et al, "Knowledge web-based system architecture for collaborative product development" Jul. 2004, Computers in Industry 56, pp. 125-140.*

U.S. Appl. No. 10/379,353, filed Mar. 4, 2003, entitled Method for Optimal Design and Rehabilitation of Water Distribution Systems, by Wu et al.

U.S. Appl. No. 10/104,714, filed Mar. 22, 2002, entitled Automatic Parameter Estimation Extension for Variable Speed Pumps, by Todini et al.

* cited by examiner

| Pump Query View | | | | | | |
|---|---|---|---|---|---|---|
| Contact User | Search Date | User ID | Region | Project Phase | Applications | Design Flow | Design Head |
| Contact User | 11/11/2003 4:14:35 PM | | | | | 250,000 | 21,000 |
| Contact User | 11/11/2003 4:05:59 PM | | | | | 250,000 | 21,000 |
| Contact User | 11/11/2003 4:05:42 PM | | | | | 250,000 | 21,000 |
| Contact User | 11/8/2003 2:55:06 PM | | | | | 400,000 | 21,000 |
| Contact User | 11/8/2003 2:54:13 PM | | test | Trial | | 250,000 | 21,000 |
| Contact User | 11/8/2003 2:53:22 PM | | test2 | test1 | | 450,000 | 41,000 |
| Contact User | 11/8/2003 2:42:15 PM | | | Master Planning | | 250,000 | 21,000 |
| Contact User | 11/8/2003 1:34:34 PM | | | | | 250,000 | 21,000 |
| Contact User | 10/15/2003 11:37:27 AM | | | | | 250,000 | 21,000 |
| Contact User | 10/15/2003 11:14:21 AM | | | | | 1500,000 | 250,000 |
| Contact User | 10/14/2003 7:03:55 PM | | | | | 250,000 | 21,000 |

SYSTEM FOR PROVIDING COLLABORATIVE COMMUNICATIONS ENVIRONMENT FOR MANUFACTURERS AND POTENTIAL CUSTOMERS

BACKGROUND OF THE INVENTION

1. Field of the Invention

This invention relates generally to systems for providing communications and search features to users in a particular industry over a network, such as the Internet.

2. Background Information

As more and more businesses in a variety of industries use computers to supply content and information to potential customers, there is an increased need for communications services that can be provided in order to make connections between manufacturers, suppliers and customers. The Internet and worldwide web (WWW) provide a continuous worldwide communication structure that is open to individual manufacturers, suppliers and customers. However, in the global community, so much information exists and so many manufacturers and suppliers have individual web sites, that it becomes an overwhelming task for a user such as a potential customer to search and evaluate each individual manufacturer's or supplier's web site for performance data, costs and other particulars regarding competing products in the field.

Various commerce systems over the Internet have been known in the art for matching a prospective buyer with a seller using which a prospective buyer may place a bid on an item. For example, U.S. Pat. No. 6,058,379 (Odom et al.) describes a real-time network exchange with seller-specified exchange parameters and interactive seller participation. But, such services typically assume that the buyer is aware of the item in the first place, and/or these services may not provide the level of detailed information required for making a purchase of a large piece of engineering or manufacturing equipment for a particular engineering design project.

Furthermore, even if a customer knows one or more manufacturers in the field, those manufacturers each may publish catalogs of information about their products and these catalogs may or may not be available on the Internet. Even if they are available online, the volume of information contained in each catalog on each web site makes product comparisons a time-consuming and difficult task. In addition, though the information may be accessible, there still may not be a tool for evaluating the suitability of the product in the design project for which the product is being considered.

Furthermore, customers may be reluctant to contact manufacturers directly until they have more information about the products in order to avoid the time involved in being contacted by sales representatives. Up to now, there has not been a forum in which users could make queries about products anonymously, and manufacturers could contact those users in a neutral site, while the user's identity is maintained as confidential.

There remains a need, therefore, for a service that provides users with a unified source of the most relevant information within their particular industry on a single web site, and which allows for users to find the most suitable products, and alternatives, and to make an informed comparison to aide in the ultimate decision as to the selection of the product that best fits the user's needs.

SUMMARY OF THE INVENTION

The disadvantages of prior techniques are overcome by the present invention, which provides a method and system for an integrated Internet-based solution that is industry specific and provides a unified collection of searchable information and a collaborative communications environment for members within the industry, with the invention being embodied in a software program and associated Internet tool comprising a web portal. The software program and web portal which is a robust web site that provides a variety of services, access an associated database that contains information about products, including manufacturers catalogs, and other information for the relevant industry involved in the specific application of the invention. Using the software program and the web portal of the present invention, a user can construct a query to search the database for products that meet that user's unique design criteria. The query can be submitted under a unique key or user name, either of which will maintain the user's identity as confidential. Query results are returned that provide the best-fit solutions for the user's proposed design.

These query results are also made available on a web page targeted for manufacturers and suppliers in the industry whose products are featured on the web portal. The manufacturer's page also includes a link using which the manufacturer can initiate an open dialog, such as through a message board, to the user. However, the user's identity is concealed from the manufacturer. The user can reply with further questions or other items. The user can also choose to reply and provide further information, or request that the manufacturer contact the user directly.

Other features include pages that provide detailed product performance comparisons. Links to manufacturers' and suppliers' web sites can also be included if desired in a particular application of the invention.

As noted, the system of the present invention can be directed to a particular industry. More specifically, the illustrative embodiment of the invention involves the hydraulic pump industry in which pumps are manufactured and supplied for users who are civil design engineers in the field of municipal water distribution, fire flow, sanitary sewer services, and storm water management and other hydraulic applications. In the illustrative embodiment, the system includes a database that contains multiple manufacturer and supplier catalogs of pump and other related products, which the user can simultaneously reference to evaluate products in the context of the users customized design criteria.

The method and system of the present invention further employ a search engine that runs searches based upon a query designed by the user involving design criteria for a particular project or application. For example, in the hydraulic pump embodiment, the search criteria may include target flow in gallons per minute and target head in feet. Battery or other power requirements may also be provided. The search is performed and the best fit solutions are returned as search results, i.e., the optimal pumps for the system that meet those criteria. As well as listing the pump model and manufacturer, a link to the manufacturer's catalog for the product, and a link to the manufacturer's web site may be provided. The associated electronic database also includes up-to-date pump performance curves for each product, which can also be displayed for the user's information.

In addition to returning the results of the query, the query is posted on an associated message board so that communication can be established between pump manufacturers and the users. Manufacturers can contact potential customers via a screen name, using the communication link in order to provide up-to-date product information, or to discuss custom requirements. And, the user can reply, but can maintain confidentiality, if desired.

With all of this information readily at hand, the user can make an informed comparison, which aids in the ultimate decision for selecting the best-fit pumps for the user's design. The system also includes superior graphing and reporting capabilities and an ability for the user to save information in a customized webpage designed specifically for that user.

BRIEF DESCRIPTION OF THE DRAWINGS

The invention description below refers to the accompanying drawings, of which.

DETAILED DESCRIPTION OF AN ILLUSTRATIVE EMBODIMENT

It should be understood that though the invention as described herein, for purposes of illustration, is discussed with reference to a hydrology and hydraulics solution, the invention is equally applicable and readily adaptable for use in other technologies and industries where users may have an interest in comparative evaluations of products and the information associated therewith from various manufacturers being provided in a central location.

Figure 1:
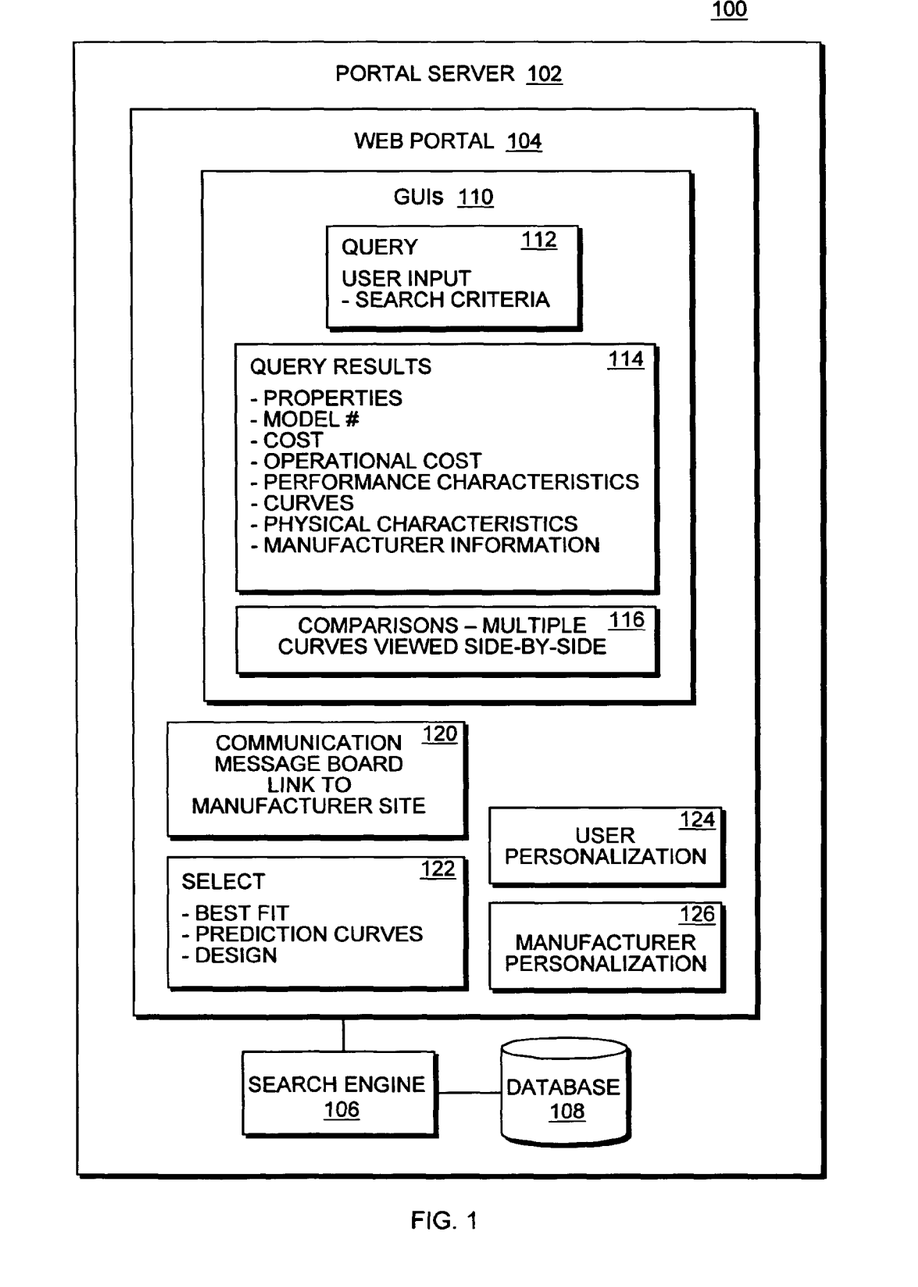
FIG. 1 is a schematic block diagram of the system of the present invention, including the portal server and web portal.

The system of the present invention is schematically illustrated in FIG. 1. The system 100 includes a portal server 102, which is a suitable application that is used to develop, deliver and maintain a web portal 104. As will be understood by those skilled in the art, the portal server is a network server that deploys portal services to a public website or internal intranet. It includes a variety of tools and functions, one of is a user-authentication program using which manufacturers and/or customers register, and the registered manufacturers or customers can then avail of the services provided by the web portal, depending upon the particular application with which the invention is used.

The portal server 102 establishes and maintains the web portal 104. Appropriate software for performing searches is schematically illustrated as search engine 106. The search engine 106 communicates with an associated database 108, which may or may not be co-located with the portal server 102. In fact, the database 108 can be located at a separate site or can be constructed of information drawn from many sources. Additional information can be entered into the database and/or current information can be updated, if necessary.

The web portal 104 includes graphic user interfaces ("GUIs"), collectively identified by reference character 110, and they include, for example, a GUI that allows a user to enter a query 112. The query relates to the particular products available in the industry being served by the web portal 104. The query GUI 112, as discussed hereinafter, includes search criteria that the user can select that can then be used to perform a search via the search engine 106. Query results are returned in response to the query and these query results are schematically illustrated as the GUI 114.

In the illustrative embodiment, the industry is water distribution, sewer and waste management, storm water drainage and other hydrology and hydraulic applications. The query results thus may include properties of the product, a model number, cost, operational cost, performance characteristics, performance curves, physical characteristics and manufacturer contact information. It should be understood by those skilled in the art that many other items of information could be included in the web portal content as may be necessary or desirable for providing a complete response to the query.

Another aspect of the invention is that the web portal 104 also provides the ability to compare multiple products that fit the search criteria. This is illustrated schematically as item 116 under the GUI 110. These functions include side-by-side displays of performance curves of competing products for comparison.

In addition to allowing the user to enter search criteria and obtain query results listing products that meet the search criteria, the web portal of the present invention also provides an opportunity for communication between manufacturers of those products and the user who has entered the query. Several communication vehicles 120 are provided. A message board, for example, is provided for open collaborative communication between manufacturers and users. For example, as discussed hereinafter, a manufacturer will have the information about any queries that are made that have involved that manufacturer's products. The manufacturer can then post a message to that user, employing the users "screen name" that provides a communication link between the manufacturer and the user, but which maintains the confidentiality of the user's identification, unless the user would choose to provide that information directly to the manufacturers, for example. The communication vehicles 120 also include links to the manufacturer's website, which may include additional information that the user may wish to consider when evaluating that manufacturer's products.

From the query results, the user may want to select a product from those returned in the query results 114. A select function 122 is provided, which involves the search engine 106 returning a best-fit solution that provides an accurate match to the design criterion created by the user. This can also include modeling and prediction curves that predict the operation of that pump in the system as designed by the user.

Figure 2:
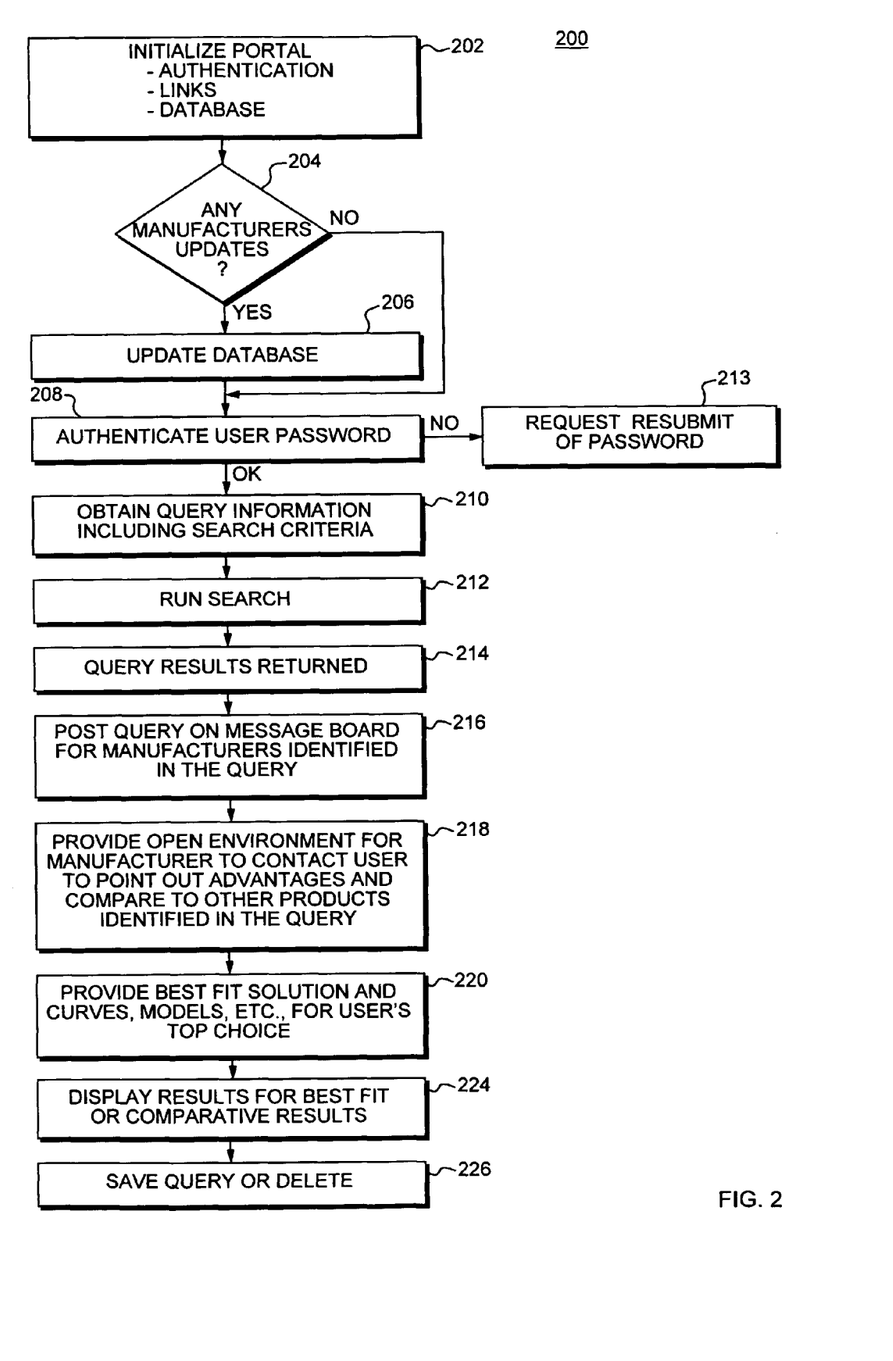
FIG. 2 is a flow chart of a procedure in accordance with the present invention.

The method of the present invention is illustrated in a procedure 200 set forth in greater detail in the flow chart of FIG. 2. For various aspects of the method, graphic user interfaces ("GUIs") are provided to access to the web portal for introducing and retrieving information. As the process of the invention is discussed with FIG. 2, the GUIs that are relevant to particular steps are referenced as they arise.

As illustrated in step 202 of FIG. 2, a portal is generated and contains appropriate programs for authentication, web linking, searching functions and industry-specific content, which in the hydraulic pump illustrative example product catalogs from hydraulic pump manufacturers, that include model numbers and associated performance characteristics such as discharge diameter, maximum speed, maximum sphere size, maximum stages, maximum temperature, motor frequency, suction diameter, and the like. Physical characteristics can indicate what applications the pump has, such as water, sludge or other liquid. Performance curves, which are plots of flow versus head, or flow versus horsepower, or efficiency, are also an important item of information in the field. All of this information is introduced into the associated database. Once all of this is provided, the web portal is launched and ready to provide services.

From time to time a manufacturer may have updates to the catalog information, which is included in the database and this can be provided in the portal in a special manufacturer's page using which the professional can enter updates and additional information about or new information about new products, as illustrated in the step 204. If there are manufacturer's updates, the portal administrator can, from time to time, update the database, as illustrated in step 206.

If there are no updates, then the procedure simply continues to wait for a user to enter a query. When a user accesses the portal, the user (already registered) enters a password in a manner that is well understood by those skilled in the art. The password is authenticated and if the user is correctly identified, the program then continues to step 210. If the password is not correct, then a routine will be initiated instructing the user to reenter the password step 212, or otherwise an error page if this routine times out prior to the user entering the correct password.

Figure 3:
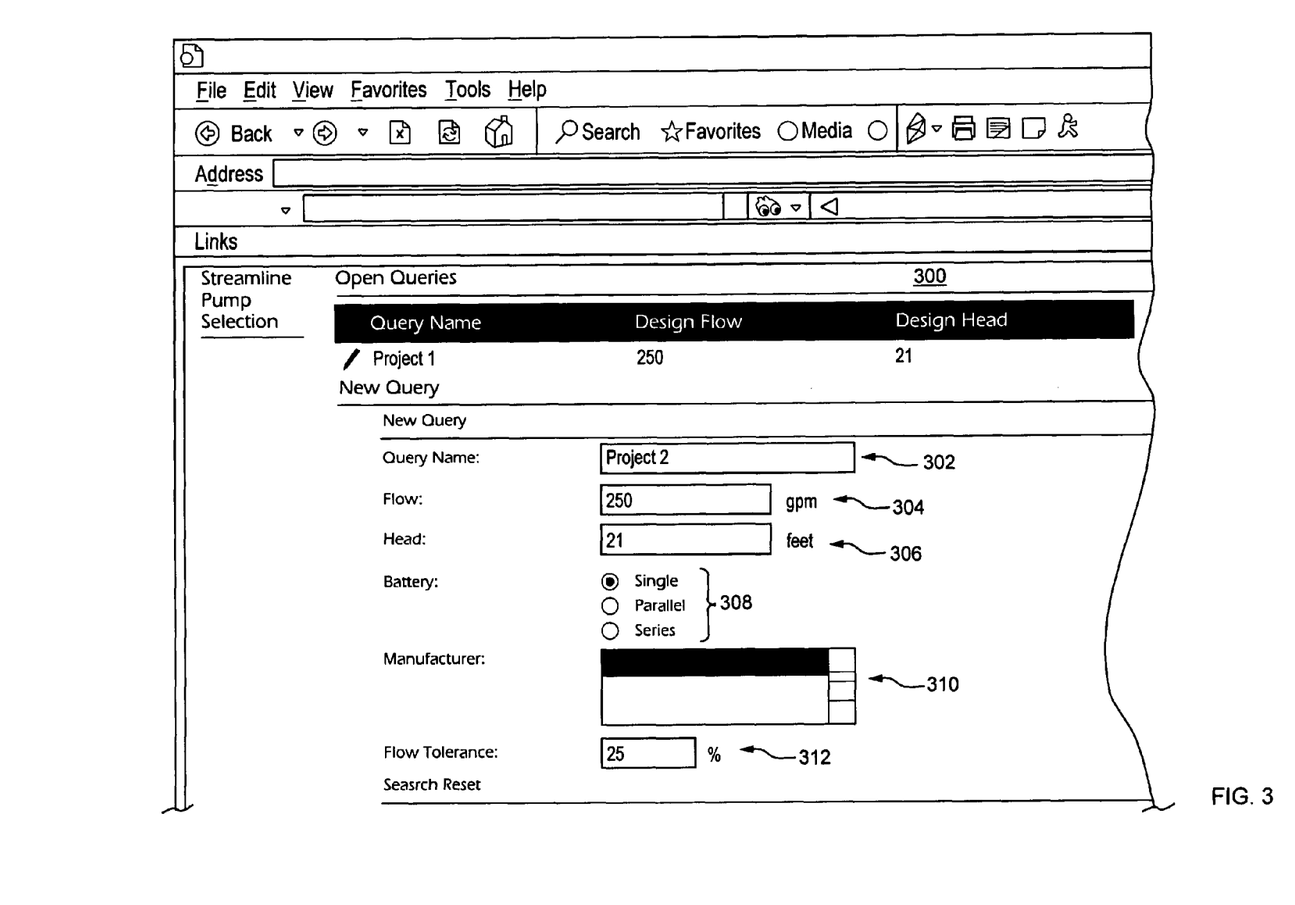
FIG. 3 together form a graphic user interface (GUI), which illustrates the screen for a user to enter a query in accordance with an illustrative embodiment of the invention.

Assuming the correct password is entered, the query information is obtained from the user, as shown in step 210. This can be accomplished using the GUI of FIG. 3, which illustrates a screen 300 that has a series of dialog boxes and pull down windows using which the search criterion can be entered. More specifically, in the example of FIG. 3, the user may enter a Query Name in the box 302. Then, the target flow and target head can be entered into boxes 304 and 306, respectively. The required battery configuration can be selected in the area 308. A preferred manufacturer can be selected from the pull down window 310. In addition the flow tolerance can be entered into the box 312.

Returning now to the procedure 200 of FIG. 2, once the search criteria is entered by the user, that search criteria is used and a search is run, as shown in step 212 and query results are returned as illustrated in step 214.

In the meantime, while the user is reviewing search results, the query is made visible to manufacturers that may log on to the portal, as illustrated in step 216. In this way, a manufacturer can determine that users have been provided with an opportunity to consider that manufacturer's products and can also see the query results, which return other manufacturers' products.

Figure 4:
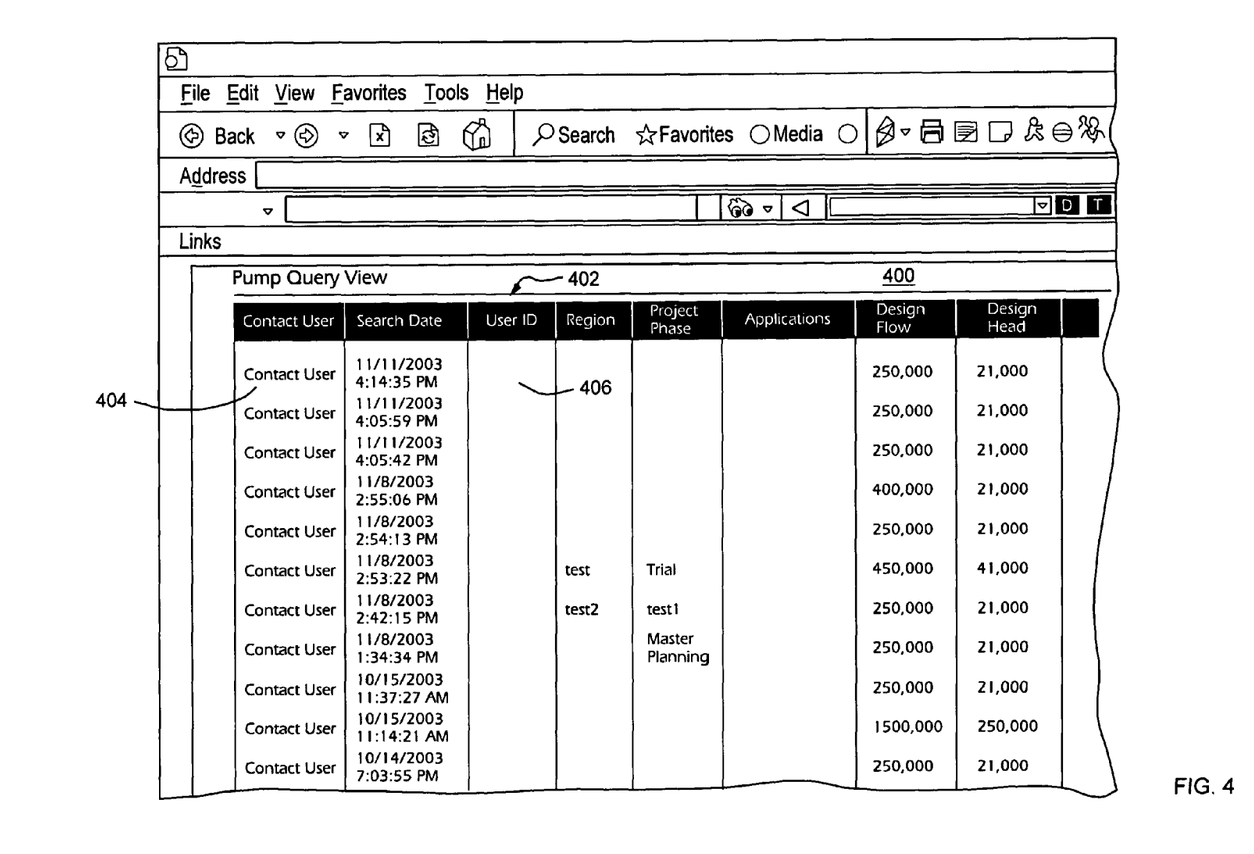
FIG. 4 is a GUI, which the manufacturer can use to view queries and enter communications to the user.

As illustrated in the GUI 400 of FIG. 4, a spreadsheet 402 provides the manufacturer with information about queries that have been made. A "contact user" link 404 is provided for each user. Selecting this link sets up a communication link, such a message board that allows a manufacturer to post a message to the user. It is noted that the user's screen name 406 is a fictitious ID selected by the user, which maintains the user's confidentiality. Yet, the web portal of the present invention allows the manufacturer to contact the user in a collaborative, neutral environment, and, for example, point out advantages of that manufacturer's products and compare those to the other products that may have been returned in the query results.

This can be performed in real time so that, for example, an instant message can immediately be returned to the user or can simply be on a message board that the user can check periodically. Should the user be interested in contacting the manufacturer directly, in addition to the message board, a link to the manufacturer's website will also be provided in the portal. This provides an open environment for the manufacturer to contact the user and point out advantages of his or her products and identify other products identified in the query, and this is illustrated in step 216 and 218 (FIG. 2).

Figure 5:
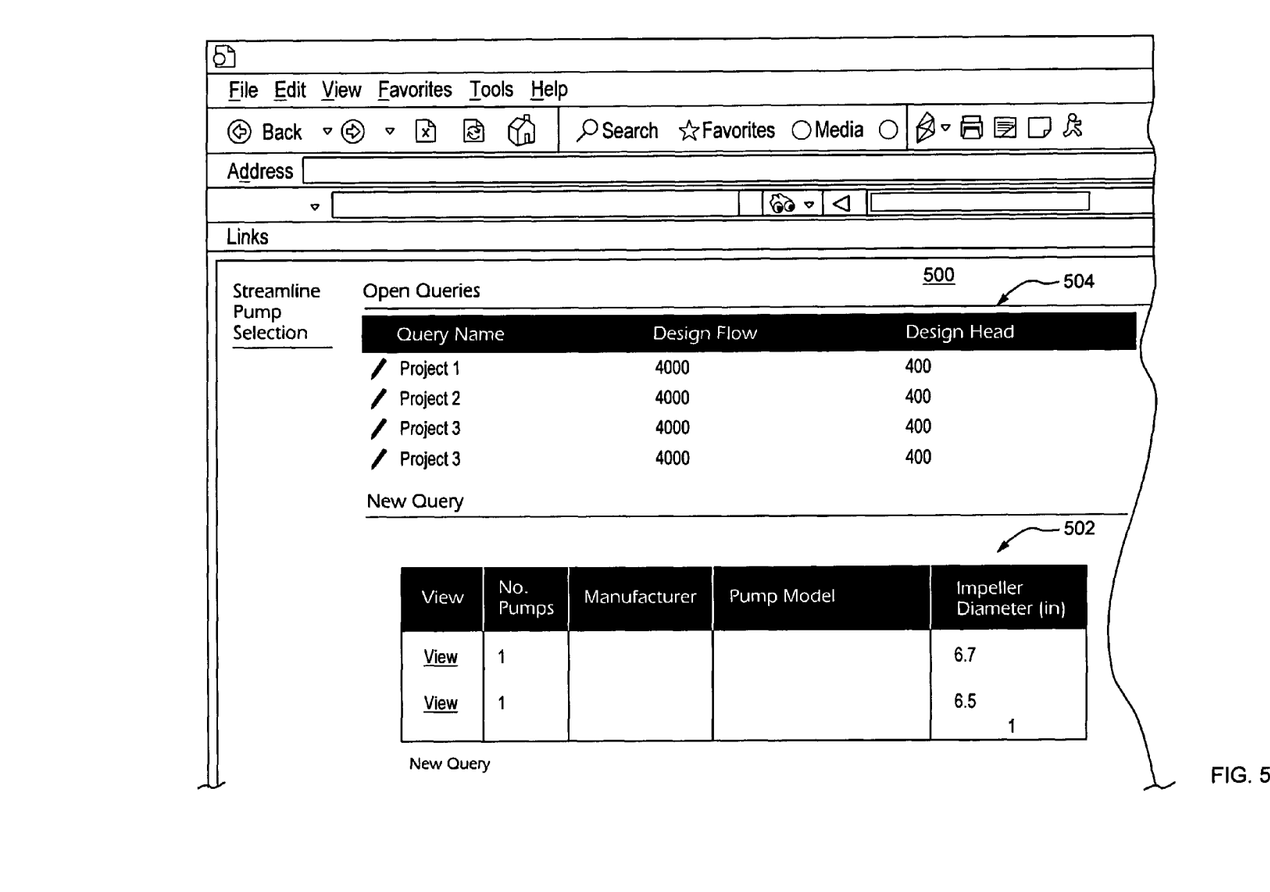
FIG. 5 is a web page in which the user can save and review previous queries.
Figure 6:
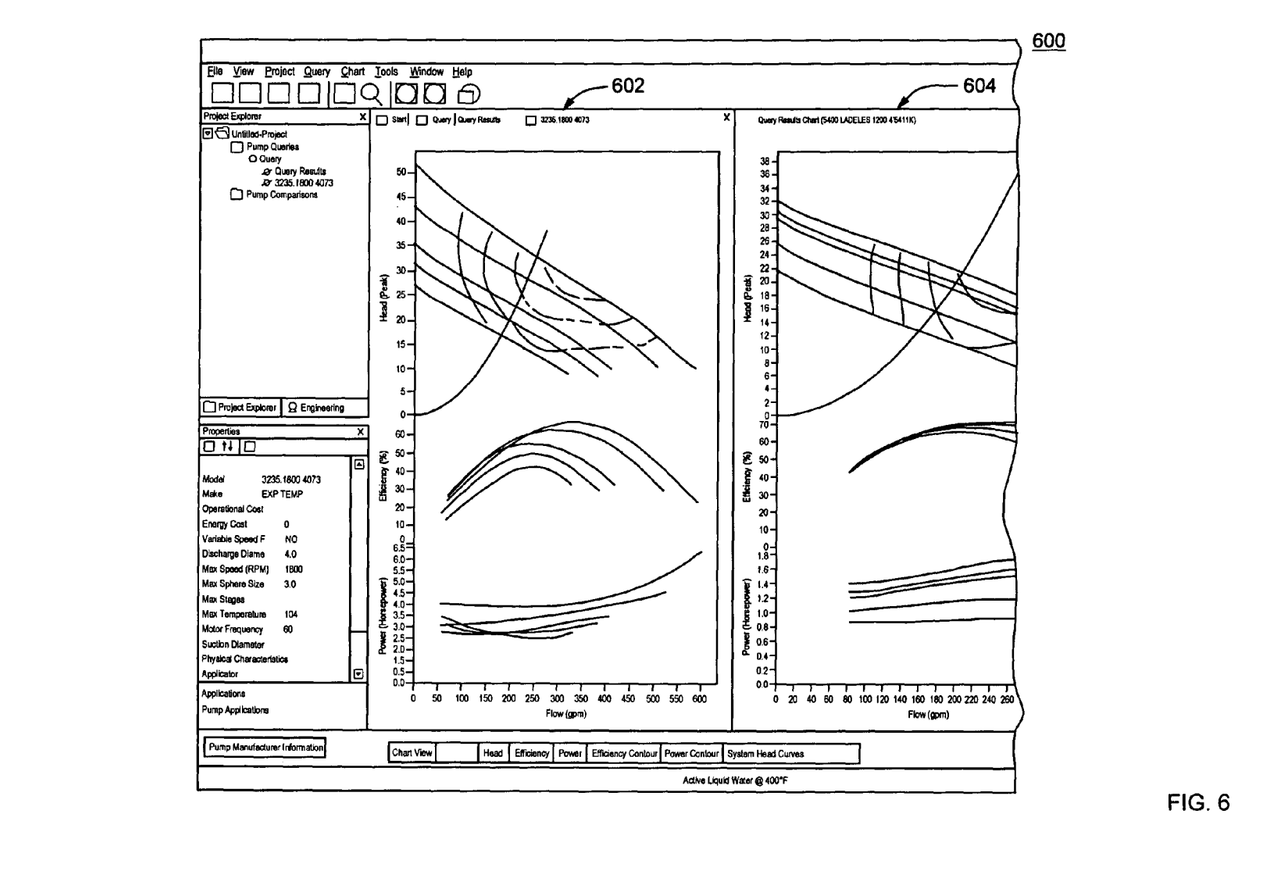
FIG. 6 is a screen shot of a side-by-side comparison of performance curves of pumps being evaluated using the system of the present invention.

From the user's perspective a list of results that satisfy the user's search criterion, is shown in the panel 502 of the GUI 500 of FIG. 5. For each of the pumps listed in the Query results, i.e., the best-fit solutions for that user's search criterion, performance curves can be displayed for evaluation, as illustrated in step 220 of FIG. 2. In addition, comparative results of the several solutions can be displayed in a number of ways (step 224). More specifically, as illustrated in FIG. 6, the screen 600 displays performance curves 602, 604 for two candidates. The user can then compare these curves.

The user can then save the query, as illustrated in step 226, for later evaluation, and this can be done using the Open Query panel 504 in the pump selection screen of FIG. 5. A user can decide to delete the query and begin with a new set of search criteria.

It should be understood that the web portal system of the present invention provides an open environment for manufacturers in an industry to communicate with potential customers, and for customers to search for best-fit solutions for design projects, such as pumping stations. The optimum pump can be selected for a user's system using all of the information available via the web portal.

The foregoing description has been directed to specific embodiments of the invention, it will be apparent however that other variations and modifications may be made to the described embodiments with the attainment with some or all of the advantages of such. Therefore, it is the object of the appended claims to cover all such variations and modifications as come within the true spirit and scope of the present invention.

What is claimed is:

1. A method of providing web-based industry specific services comprising the steps of:
   (A) establishing a web portal on a computer;
   (B) providing said web portal with an associated database that maintains information regarding products offered by manufacturers in a specific industry, each manufacturer being different than a customer;
   (C) providing an interface by which the customer can set up a query about needed products offered by the one or more manufacturers for use in a particular engineering design project of the customer, the query specifying design criteria for the particular engineering design project of the customer;
   (D) providing a search engine coupled to said associated database that, in response to the design criteria of the customer's query for needed products offered by the one or more manufacturers, searches said database and returns, to the customer, a list of manufacturers' products offered by the one or more manufacturers that meet the design criteria for the particular engineering design project of the customer;
   (E) in response to the customer's query to the search engine, and absent additional action by the customer, providing a manufacturer of one of the products on said list that meets the design criteria for the particular engineering design project with an interface showing a description of the customer's query; and
   (F) providing a hyperlink in the interface provided to the manufacturer of one of the products on said list that meets the design criteria for the particular engineering design project, using which the manufacturer of one of the products on said list can post a message on a message board to contact the customer to communicate about said manufacturer's products.

2. The method of claim 1, further comprising the step of providing a communication link for said customer to contact said manufacturer.

3. The method as defined in claim 1, further comprising the step of providing a means by which the customer can save queries and review query results subsequently.

4. The method as defined in claim 1, further comprising the step of providing a best-fit solution for said customer's query, wherein a best-fit solution is a product that provides an accurate match to the design criteria for the particular engineering design project of the customer.

5. The method as defined in claim 1, wherein the needed products include hydraulic pumps and the list of manufacturers' products include a list of manufacturers' hydraulic pumps, and the method further comprises the step of displaying to the customer performance curves for one or more hydraulic pumps in the list to permit the customer to predict the operation of the one or more hydraulic pumps in a system.

6. The method as defined in claim 5, wherein the step of displaying further comprises the step of displaying at least two performance curves in side-by-side panes for comparison.

7. The method as defined in claim 1, further comprising the step of updating, by a manufacturer, the information contained in said associated database.

8. A method of providing web-based industry specific services comprising:
providing a web portal on a computer;
providing said web portal with information regarding products offered by manufacturers in a specific industry, each manufacturer being a different entity than a customer;
providing an interface to said web portal by which the customer can enter a query for needed products offered by one or more manufacturers for use in a particular engineering design project of the customer, the query specifying design criteria for the particular engineering design project of the customer;
providing a search engine coupled to said web portal, that, in response to the design criteria of the query from the customer for needed products offered by the one or more manufacturers, searches for manufacturers' products offered by the one or more manufacturers that meet design criteria for the particular engineering design project of the customer, and returns, to the customer, a list of one or more manufacturers' products that meet the design criteria for the particular engineering design project of the customer;
in response to the query from the customer at the search engine and absent additional action by the customer, providing a manufacturer of one of the products on said list that meets the design criteria for the particular engineering design project with an interface that shows a description of the query entered by the customer.

9. The method of claim 8 further comprising:
providing a hyperlink in the interface provided to the manufacturer of one of the products on said list, using which the manufacturer of one of the products on said list contacts the customer.

10. The method of claim 9 further comprising:
allowing the manufacturer of one of the products on said list to contact the customer, while concealing the customer's identity from the manufacturer of the one of the products on said list.

11. The method of claim 8 wherein the specific industry is a hydraulic pump industry and the products offered by the one or more manufacturers include hydraulic pumps.

12. The method of claim 11 wherein the design criteria for the particular engineering design project of the customer specifies at least one of a target flow rate, a target head or a power requirement for a hydraulic pump in the particular engineering design project of the customer.

13. The method of claim 8 wherein further comprising:
posting the query from the customer on a message board.

14. A system for providing web-based industry specific services comprising:
a computer;
a web portal operating on the computer;
an interface to said web portal that is configured to receive a query from a customer for one or more hydraulic pumps offered by one or more manufacturers in the hydraulic pump industry for use in a particular water distribution project of the customer, the query specifying design criteria for the particular water distribution project of the customer, the design criteria including at least one of a target flow rate, a target head or a power requirement for a hydraulic pump in the particular water distribution project of the customer;
a search engine coupled to said web portal, that, in response to the design criteria for the particular water distribution project of the customer specified in the query from the customer for one or more hydraulic pumps offered by the one or more manufacturers, is configured to search for hydraulic pumps offered by the one or more manufacturers that meet the design criteria for the particular water distribution project of the customer, and return a list of one or more manufacturers' hydraulic pumps that meet the design criteria for the particular water distribution project of the customer;
an interface that is provided to a manufacturer of one of the hydraulic pumps on said list in response to the query from the customer at the search engine and absent additional action by the customer, and that shows a description of the query from the customer.

15. The system of claim 14 further comprising:
a hyperlink in the interface provided to the manufacturer of one of the hydraulic pumps on said list that, when used, contacts the customer.

16. The system of claim 14 wherein the interface provided to the manufacturer of one of the hydraulic pumps on said list conceals the customer's identity from the manufacturer.

* * * * *